United States Patent
Olaker (10) Patent No.: US 7,191,385 B2
(45) Date of Patent: Mar. 13, 2007

(54) ERROR CORRECTION IN A LOCATING METHOD AND SYSTEM

(75) Inventor: David A. Olaker, Melbourne, FL (US)

(73) Assignee: Locus Location Systems, LLC, W. Melbourne, FL (US)

( * ) Notice: Subject to any disclaimer, the term of this patent is extended or adjusted under 35 U.S.C. 154(b) by 498 days.

(21) Appl. No.: 10/755,197

(22) Filed: Jan. 9, 2004

(65) Prior Publication Data

US 2004/0216016 A1    Oct. 28, 2004

Related U.S. Application Data

(60) Provisional application No. 60/465,103, filed on Apr. 24, 2003.

(51) Int. Cl.
   *H03M 13/45* (2006.01)
(52) U.S. Cl. .................................... 714/780
(58) Field of Classification Search ............... 375/340; 714/709, 780, 809
   See application file for complete search history.

(56) References Cited

U.S. PATENT DOCUMENTS

| | | | | |
|---|---|---|---|---|
| 4,240,156 A * | 12/1980 | Doland | ...................... | 714/791 |
| 4,614,933 A * | 9/1986 | Yamashita et al. | ............ | 341/51 |
| 4,812,852 A | 3/1989 | Bent et al. | | |
| 4,916,455 A | 4/1990 | Bent et al. | | |
| 5,208,816 A * | 5/1993 | Seshardi et al. | ............ | 714/795 |
| 5,267,271 A * | 11/1993 | Rice | ............ | 375/343 |
| 5,327,439 A * | 7/1994 | Estola et al. | ................ | 714/795 |
| 5,446,762 A | 8/1995 | Ohba et al. | | |
| 5,577,053 A * | 11/1996 | Dent | .......................... | 714/755 |
| 5,673,291 A * | 9/1997 | Dent | .......................... | 375/262 |
| 5,706,313 A * | 1/1998 | Blasiak et al. | .............. | 375/330 |
| 5,757,821 A * | 5/1998 | Jamal et al. | ................ | 714/746 |
| 5,784,392 A * | 7/1998 | Czaja et al. | ................ | 714/786 |
| 5,867,059 A | 2/1999 | Huang et al. | | |
| 5,910,182 A * | 6/1999 | Dent et al. | .................. | 714/786 |
| 6,018,546 A * | 1/2000 | Rege | .......................... | 375/148 |
| 6,061,823 A * | 5/2000 | Nara | .......................... | 714/758 |
| 6,105,158 A * | 8/2000 | Chen et al. | ................. | 714/755 |
| 6,393,599 B1 * | 5/2002 | Chan | ......................... | 714/797 |
| 6,519,740 B1 * | 2/2003 | Mårtensson et al. | ........ | 714/822 |
| 6,684,367 B1 * | 1/2004 | Maerkle et al. | ............. | 714/790 |
| 6,697,441 B1 * | 2/2004 | Bottomley et al. | ......... | 375/340 |
| 6,732,328 B1 * | 5/2004 | McEwen et al. | ............ | 714/795 |
| 6,741,638 B2 * | 5/2004 | Ramberg et al. | ............ | 375/150 |
| 6,934,321 B2 * | 8/2005 | Sato | .......................... | 375/150 |
| 7,054,392 B2 * | 5/2006 | Chappaz | ..................... | 375/341 |

* cited by examiner

*Primary Examiner*—Stephen M. Baker
(74) *Attorney, Agent, or Firm*—James H. Beusse; Beusse Wolter Sanks Mora & Maire, P.A.

(57) ABSTRACT

A method of detecting and correcting bit errors in a digitally encoded data stream includes correlating a received bit transition in the data stream with a multitude of possible bit transitions to generate corresponding correlated bit transition values. A bit transition decision corresponding to a greatest correlated bit transition value is then generated for the received bit transition. Consecutive bit transition decisions generated for the data stream are compared to identify bit transition decision errors. Respective bit transition decisions are examined to determine if each decision is consistent with a prior adjacent bit transition decision in the data stream. If a bit transition decision error is identified, then the next greatest correlated bit transition decision is substituted for the bit transition decision in error.

12 Claims, 4 Drawing Sheets

FIG. 4 ably, processing requirements and data transmission bandwidths may be reduced because received waveforms do not need to be forwarded to a central site by respective receivers, nor do the received waveforms need to be cross-correlated at the central site as conventionally required.

ERROR CORRECTION IN A LOCATING METHOD AND SYSTEM

SPECIFIC DATA RELATED TO INVENTION

This application claims the benefit of U.S. Provisional Patent Application No. 60/465,103 filed Apr. 24, 2003.

FIELD OF THE INVENTION

This invention relates generally to the field of communications, and, in particular, to error correction in systems for locating a transmitting unit radiating a digitally encoded signal.

BACKGROUND OF THE INVENTION

It is known to determine the location of a transmitting unit based on time of arrival differences or phase differences of a signal radiated by the unit at spatially separated receivers. Proposed techniques have included detecting a phase difference at respective receivers of a steady tone radiated by the unit, detecting a time difference of arrival for clock synchronized pulses radiated by the unit, and detecting a time difference of arrival of a common reference level of a randomly modulated signal. However, such techniques require that the transmitter radiate an additional signal comprising the required locating information, or that a complex, computationally intensive processing technique be used to recognize a common characteristic of a randomly modulated signal to identify a time delay of arrival. In addition, such techniques may require that signal samples be sent to a central processing unit for further processing to determine time difference of arrivals for the signals.

BRIEF DESCRIPTION OF THE DRAWINGS

The invention will be more apparent from the following description in view of the drawings that show.

DETAILED DESCRIPTION OF THE INVENTION

The inventors of the present invention have innovatively realized that by detecting information encoded in a transmitted digital signal, such as an Enhanced Digital Access Communications System (EDACS®), a SmartZone®, or a Project 25 formatted radio signal, the location of a transmitting unit may be quickly and efficiently determined based on time delay of arrival of a signal received at three or more spatially separated receivers. In an aspect of the invention, correlated bit transitions in a decoded digital data string are time stamped, and the resulting time stamps are compressed and provided to a central site. In another aspect of the invention, the respective times of arrivals for multiple bit transitions in the digital signal may be averaged to generate an average time of arrival for the entire decoded digital data string. The time stamp information from each of the receivers is used to determine a time delay of arrival of the signal at the spatially separated receivers. Advantageously, processing requirements and data transmission bandwidths may be reduced because received waveforms do not need to be forwarded to a central site by respective receivers, nor do the received waveforms need to be cross-correlated at the central site as conventionally required.

Figure 1:
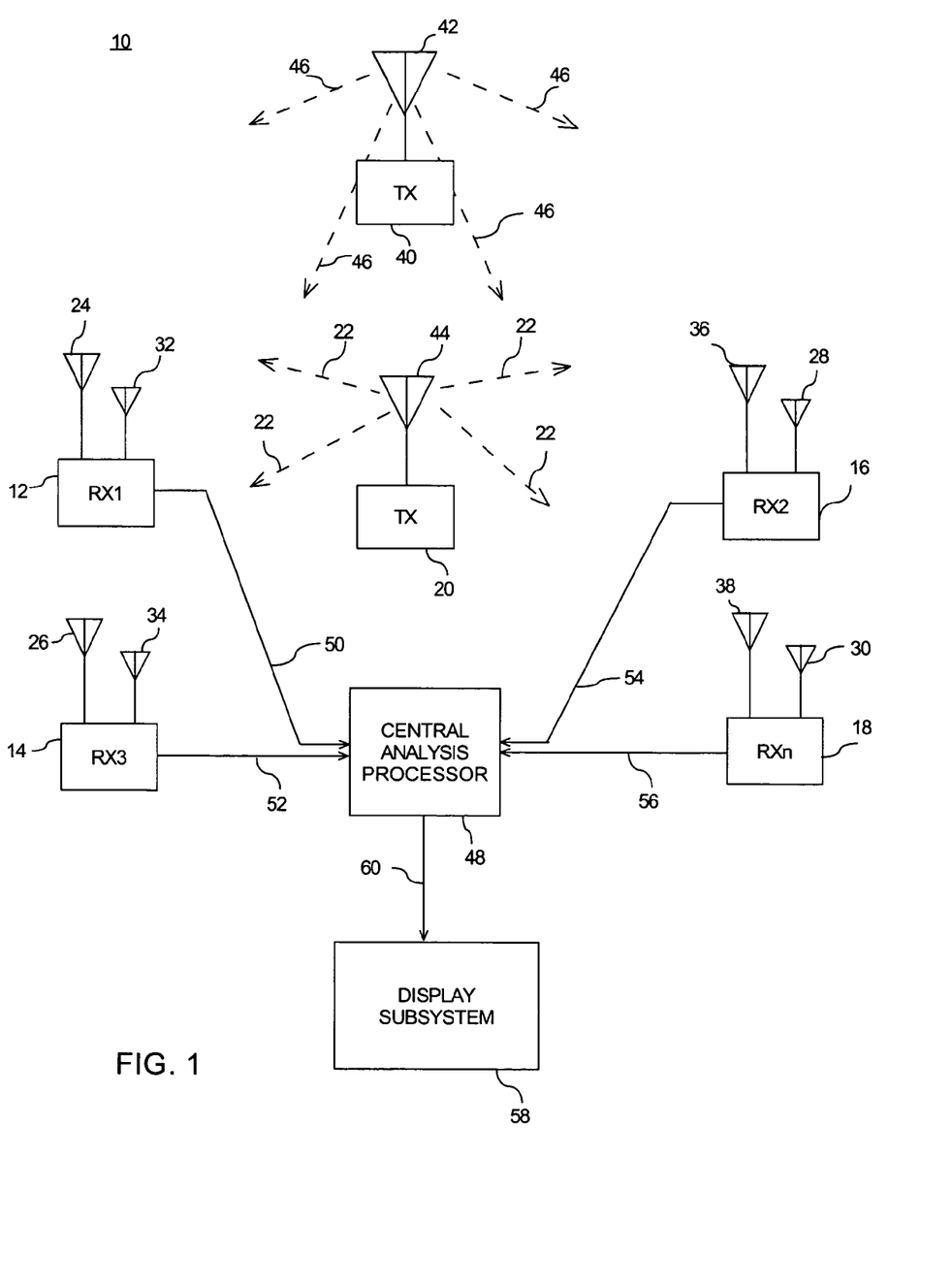
FIG. 1 is an exemplary diagram of a transmitter position locating system.

FIG. 1 is an exemplary diagram of a transmitter position locating system 10 for determining the location of a transmitting unit radiating a digitally encoded signal. The system includes a plurality of receivers 12, 14, 16, 18 for receiving signals 22 from a transmitter 20 having a transmitting antenna 44. It should be understood that the number of transmitters and receivers shown in FIG. 1 is for illustrative purposes only and any desired number of receivers may be used to implement the invention, and any number of transmitters in the receiver's range may be located. In one aspect of the invention, the transmitter 20 may be a radio, such as an EDACS® compatible radio, operated, for example, by a policeman, a fireman, or an emergency medical technician (EMT) at an unknown location. Each receiver 12, 14, 16, 18 includes a respective antenna 24, 26, 28, 30 for receiving signals from the transmitter 20. In addition, each receiver 12, 14, 16, 18 includes a respective antenna 24, 26, 28, 30 for receiving a time marker or time synchronization signal 46 from a common timing signal source 40, such as a one second timing synchronization pulse transmitted by a GPS satellite. Each receiver 12, 14, 16, 18 is coupled by respective communication links 50, 52, 54, 56 to a central analysis processor (CAP) 48, which may be remotely located relative to the receivers 12, 14, 16, 18. The CAP 48 may be coupled by a communication link 60 to a display subsystem 58, which may be remote from the CAP 48, to provide a visual display of the location of the transmitter 20.

In an aspect of the invention, each of the receivers 12, 14, 16, 18 is capable of detecting a radio transmission 22, such as an inbound control channel signal, from a transmitter 20 at an unknown location. Each of the receivers 12, 14, 16, 18 may demodulate the detected signal and decode the digital information encoded in the signal to extract digital bit transition information. The received digital bit transition information may be time tagged or time stamped with respect to a common time reference, for example, provided by the common timing signal source 40. A string of decoded, time stamped information may then be transmitted to the CAP 48. The CAP 48 receives a string of decoded, time stamped information from at least three of the receivers 12, 14, 16, 18 and determines the time difference of arrival at the respective receivers 12, 14, 16, 18 by comparing the time stamp values among the received strings for common bit transition sequences. For example, an EDACS® inbound control channel signal may include identifiable bit transition sequences such as a dotting portion, a Barker code portion, and a message portion, which may include a group ID and a unit ID. In an aspect of the invention, the message portion may be used to uniquely identify the transmitter or transmitting source of the signal.

Accordingly, receipt times of common bit transition sequences in the signal may be compared to determine timing differences among the received signals. The differences in the time stamp values of common bit transition sequences among the received strings represent the time difference of arrival of the common radio transmission 22, thus providing data for computing the location of the transmitter 20. For example, the location of the transmitter 20, may be calculated based on the time differences of arrival by using hyperbolic trilateration, as would be understood by a skilled artisan. Information, such as position information, derived from a hyperbolic trilateration technique, familiar to a skilled artisan, may be forwarded to the display processing subsystem 58 for display on a monitor (not shown). Geographic Information System (GIS) mapping software may be used in the display processing subsystem 58 for overlaying a computed transmitter position on a map display.

Figure 2:
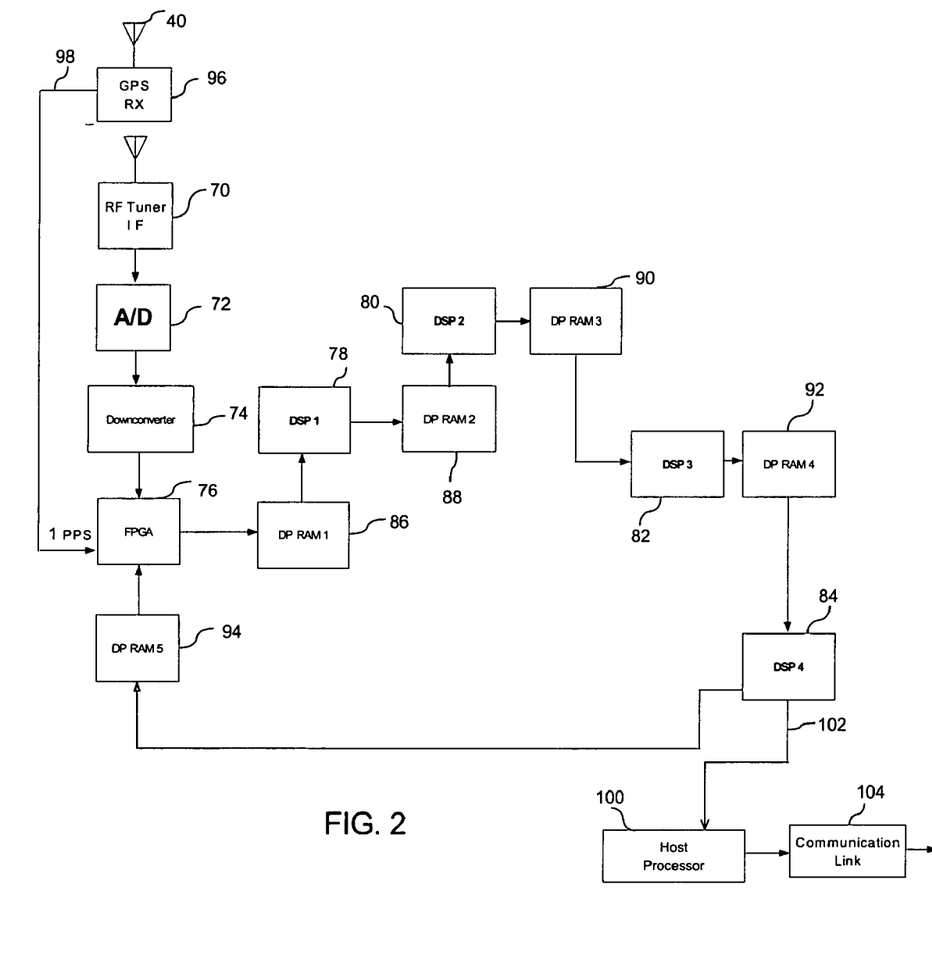
FIG. 2 is a block diagram of an exemplary receiver of the system shown in FIG. 1.

FIG. 2 is a block diagram of an exemplary receiver of the system shown in FIG. 1. Generally, the receiver 20 may include an analog RF tuner 70, an analog to digital (A/D) converter 72, a downconverter 74, a data flow controller, such as an field programmable gate array (FPGA) 76, one or several digital signal processors (DSP's) 78, 80, 82, 84, and random access memories (RAM) 86, 88, 90, 92. It should be understood that a skilled artisan would be able to change the exemplary configuration depicted in FIG. 2, such as by rearranging the blocks or providing a different number or configuration of DSP's, without departing from the scope of the invention. The receiver 20 may also include a GPS receiver 96 for receiving and providing a 1 pulse per second (PPS) synchronizing signal 98 to the receiver 20. The synchronizing signal 98 may be used to establish absolute sampled data reference timestamps for received data. In addition, the synchronizing signal 98 may be used to synchronize a system clock provided to synchronous devices, such as the A/D converter 72, the downconverter 74, the FPGA 76, and the DSP's 78, 80, 82, 84. In one form of the invention, the receiver 20 may include a host processor 100, such as a personal computer, connected, for example, via a PCI bus 102, for receiving processed information. The host processor 100 may provide the processed information, such as timestamp information, decoded message information, and status information, over a communications link 104 to the CAP 48 depicted in FIG. 1.

A received radio transmission 22, such as an inbound control channel signal, may be detected by the tuner 70, converted to a digital waveform by the A/D converter 72, and demodulated in the downconverter 74. The demodulated signal is provided to the FPGA 76 for time tagging, or time stamping, of data in the demodulated signal. The FPGA 76, provides the time stamped data, for example, in blocks of 3072 32 bit words, to DSP 1 78 through RAM 86. The FPGA 76 may include a time tag counter that increments once for every valid data cycle, such as every 20 nanoseconds. In one form, the time tag counter may be a 26 bit counter and be reset to a value of zero (0) upon receipt of the synchronizing signal 98. For example, the time tag counter may count valid data cycles until a desired bit is identified in the signal, such as a predetermined bit in a Barker code of an EDACS® inbound control channel signal. The time tag information associated with each block of data may be provided by the FPGA 76 to downstream DSP's 78, 80, 82, 84 for further processing.

The process of decoding the information in the received signal may begin in DSP 1 78. For example, the data may be filtered to remove undesired noise, and automatic gain control may be applied. A Fast Fourier Transform (FFT) may be performed on a block by block basis, for example, to generate frequency domain representations of the bit transitions, to allow processing of the data received from the FPGA 76 in the frequency domain. After performing an FFT on the data, the carrier frequency offset of the received signal may be estimated, to be used, for example, to perform carrier frequency synchronization. For each block of data, the output of the FFT, the estimated frequency offset, and the associated time stamp may be provided to DSP 2 80, for example, via RAM 2 88.

DSP 2 80 may be configured to receive FFT data from DSP 1 78 and continue decoding the data by correlating the received data waveforms with possible waveforms expected to be received. In particular, DSP 2 80 may perform a complex FFT multiplication, or convolution, of the output of the FFT with possible idealized bit transition waveforms to generate convolution responses. The convolution responses may be inverse Fourier transformed to provide correlation values between bit transitions in the received data and the idealized bit transition waveforms that are expected to be received. In an aspect of the invention, DSP 2 80 may store a series of idealized waveforms for a "00" bit transition, a "01" bit transition, a "10" bit transition and a "11" bit transition of, for example, an EDACS® signal. By convolving a received bit transition with each of the idealized waveforms in the frequency domain, a closest match between the received bit transition and one of the idealized waveforms may be determined, thereby allowing the received bit transition to be provisionally identified. After convolution, the DSP 2 80 may perform an Inverse FFT (IFFT) of the correlated data and provide the correlated data to DSP 3 82, for example, via RAM 3 90. The correlated data may include four different blocks of correlation data associated with a received block of data. Each of the four blocks of correlation data may correspond to respective bit transitions, such as "00", "01," "10," and "11." In one form, each block of correlation data (correlation block 00, correlation block 01, correlation block 10 and correlation block 11) may contain, for example, 521 data samples representing one data bit width with data sampled at 5 mega-samples per second.

Figure 3:
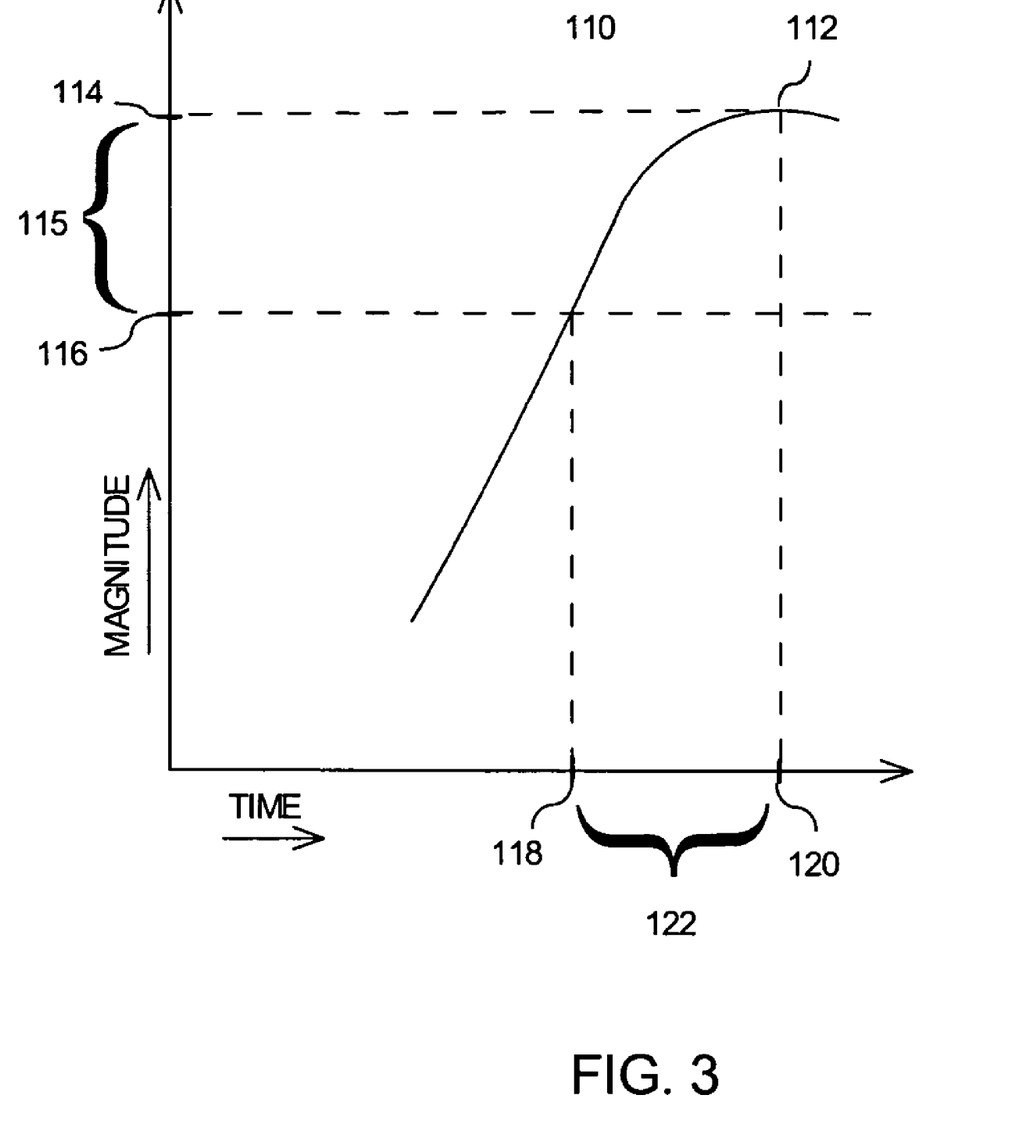
FIG. 3 depicts a portion of an exemplary correlation waveform for a bit transition.

DSP 3 82 may be configured to receive the correlation data, identify bit transitions in the data, and perform bit error correction of the received data. FIG. 3 depicts an exemplary correlation waveform 110 response for a correlated bit transition. The correlation waveform 110 represents a correspondence between a bit transition waveform in the received signal, correlated (for example, by convolution) with an idealized bit transition waveform. The correlation waveform 110 includes a correlation peak 112 representing a peak magnitude 114 of the correlation operation. The correlation waveform 110 may be characterized by a threshold magnitude 116 corresponding to a threshold crossing time, or time of arrival (TOA) 118. DSP 3 82 uses the correlation data and associated time stamp information to determine, for each correlation waveform 110, the TOA 118 for the detected bit transition, a time 120 represented by the peak 112 (having peak magnitude 114); an offset magnitude 115 calculated as the difference between the peak magnitude 114 and a threshold magnitude 116; and a bit sample offset 122, represented by the difference between the bit sample time 120 and the TOA 118. Using this information, bit rates, bit transition decisions (whether a bit transition is a "00", "01," "10", or a "11"), bit decision timing, the TOA for each bit transition, and bit transition correlation magnitude values may be determined.

Figure 4:
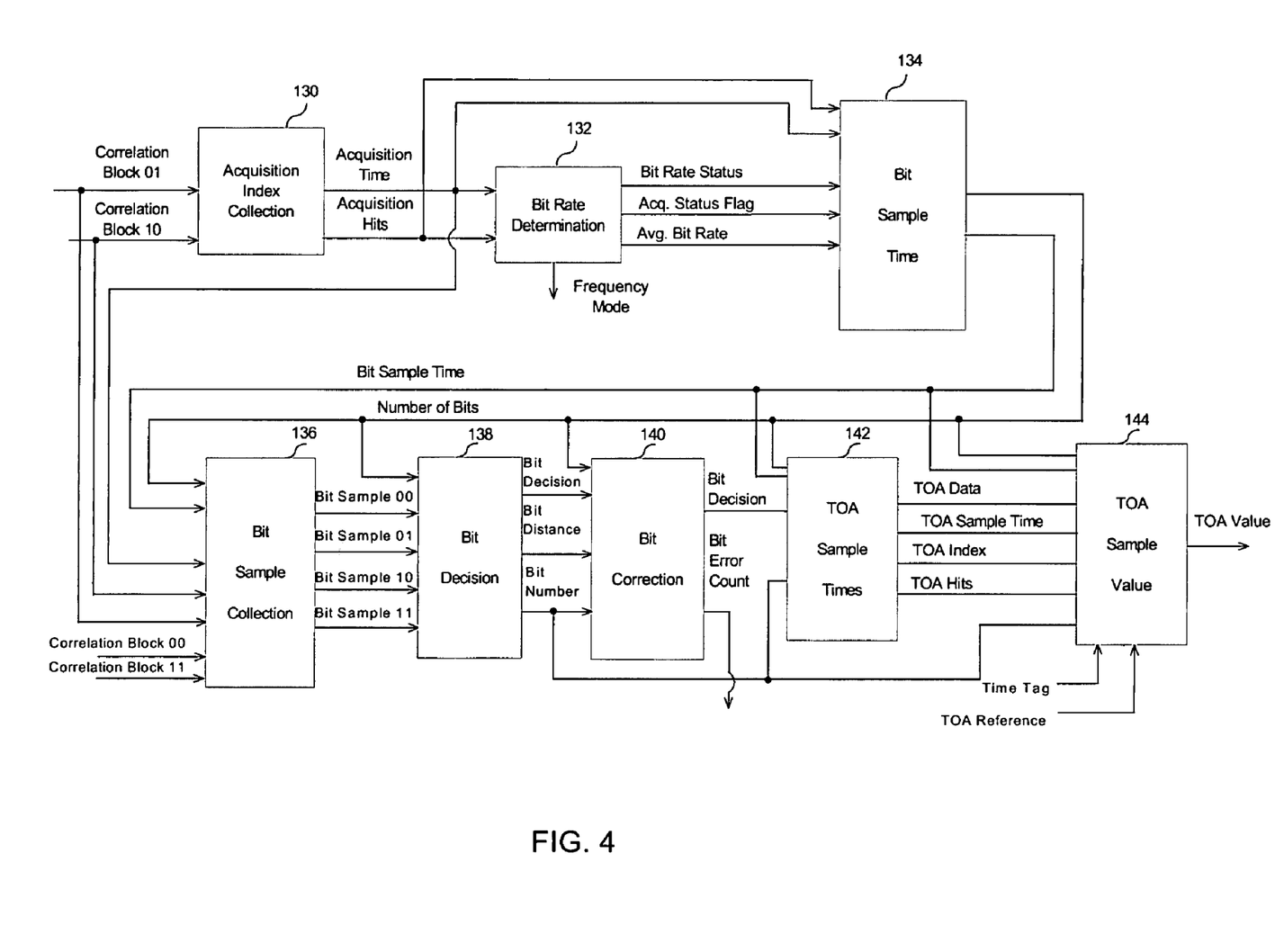
FIG. 4 is a block diagram depicting an exemplary organization of processing modules for identifying bit transitions in a data stream and performing bit error correction.

FIG. 4 is a block diagram depicting an exemplary organization of processing modules for performing the above-described functions. For example, the processing modules may be implemented in DSP 3 82 as would be understood by a skilled artisan. Accordingly, in an aspect of the invention, upon receiving correlation data from DSP 2 80, DSP 3 82, in an initial acquisition index collection module 130, compares each data point in the correlation block 01 and correlation block 10 against a desired threshold 116. This comparison saves a time index, or time stamp value, whenever the threshold 116 is first exceeded for a respective correlation waveform 110. DSP 3 82 may refrain from saving a next time order index value until a magnitude of a currently processed correlation waveform 110 has fallen to at least 90% of the threshold 116. The next time order index value is then saved when the threshold 116 is exceeded by a subsequent correlation waveform. For example, the above described acquisition mode function may be implemented using the following Matlab®, or similar computer code language:

```
% Acquisition Index Collection
acq01=0;
acq10=0;
acqhits = 0;
for i(1:1:3092,)
    if(magcorrout01(i)>35000)
        if(acq01 == 0)
            acq01 = 1;
            acqhits = acqhits + 1;
            acqtime(acqhits) = l; end
    elseif(magcorrout01(i) <30000)
            acq01 = 1;
        end
    if(magcorrout10(i)>35000)
        if(acq10 == 0)
            acq10 = 1;
            acqhits = acqhits + 1;
            acqtime(acqhits) = l;
        end
    elseif(magcorrout01(i)<30000)
        acql0=0;
    end
end
```

The acquisition index collection module 130 may then provide the number of bit transition acquisitions, or acquisition "hits," and the corresponding acquisition times to a bit rate determination module 132. The acquisition times and the number of acquisition hits may also be provided to a bit sample time module 134 for further processing.

After collecting the time order index values for a block of data, DSP 3 82, in a bit rate determination module 132, searches the time order index values for sequences of threshold crossings that are spaced in time at a desired bit rate. If the sequences of threshold crossing are spaced in time at the desired bit rate, DSP 3 82 identifies the data block as containing valid data for an initial acquisition of a signal. In an aspect of the invention, the data block may sized so that each data block contains room for storing six bit transitions. Accordingly, to ensure a relatively high degree of confidence for initial acquisition, the DSP 3 82 may declare initial acquisition when it finds five out of six possible time order index values in one block. The DSP 3 82 may then enter a tracking mode to monitor subsequent blocks for at least three out of six possible index values in each block for the next ten blocks. If any of the ten blocks fails to have at least three time order index values acquired, DSP 3 82 may return to the initial acquisition search mode. If ten consecutive blocks are successfully tracked, then the process transitions to a hold mode. In an aspect of the invention, frequency mode control information, for example, based on a bit rate determination, may be sent to a processor, such as DSP 1 78, to determine and compensate for frequency offsets. The bit rate determination module 132 may then provide a bit rate status, an acquisition status flag, and the average bit rate to a bit sample time module 134.

After determining that potentially valid data has been initially acquired, an average bit rate may be determined by dividing the sum of the time differences between acquisition of the index values, or delta times, by the number of index values acquired, or delta count. For subsequent data blocks received while in the track mode, an overall average bit rate may be determined by dividing the sum of the delta times by the delta count and then averaging the quotient with the previous blocks' quotient. During the hold mode, the last computed overall average bit rate may be used for the rest of the received message string. Sample code implementing the above described functions in Matlab® are shown below:

```
% Acquisition Determination and Bit Rate Determination
acqtrue = 0;
brhits = 0;
deltaavg = 0;
deltacount = 0;
for i(2: 1:acqhits)
    stat = 0;
    brstat(i) = 0;
    div = 1;
    brdiv(i) = 1;
    deltatime = acqtime'i) – acqtime(i–1);
    while(stat==0)
        if (delta time/div> 531)
            div =div +1;
        else
            delta time = delta time/div;
            stat = 2;
            brstat(i) =stat;
            brdiv(i) = dlv; end
    end
    if( deltatime > 511)
        deltaavg = deltaavg + deltatime;
        deltacount = deltacount + 1;
        brstat(i) = 1;
    else
        brstat(i) = 0;
    end
end
if(deltacount > 5) delta count
    acqtrue = 1
    avgbitrate = deltaavg/deltacount
end
```

When an initial acquisition of potentially valid data is recognized, bit sample times for each acquired bit transition may be generated by computing an average bit rate error for each acquired bit transition (for example, measured from the first acquired bit transition and assuming an average bit rate spacing.) Then, using the average bit rate error, an overall average bit rate, and the bit sample offset 122, bit sample times may be generated in the bit sample time module 134. This module 134 may also receive an acquisition status flag to verify that valid data has been acquired. For subsequent track mode blocks, bit sample times may be generated using the above technique with the current overall average bit rate. In an aspect of the invention, during the hold mode, the last computed overall average bit rate may be used for the rest of the message, and the sample points may be generated using previously computed track mode sample time and associated overall average bit rate. The bit sample time module 134 may then provide a bit sample time and a number of bits acquired to a bit sample collection module 136. Sample code implementing this in Matlab® is shown below:

```
% Bit Sample Times Generation
if(acqtrue == 1)
%find first good acq
for ft(2: 1:acqhits)
```

-continued

```
if(brstat(i) == 1)
    firstgood = i;
    break;
  end
end
%find last good acq
for i=(acqhits:- 1:2) if(brstat(i) == 1)
    last good = i;
    break;
  end
end
%compute bit sample times
errorcount = 0;
avgerror = 0;
for i=(firstgood: 1:lastgood) if(brstat(i) == 1)
    error = acqtime(i) - acqtime(firstgood-1);
    while(error> 10)
      error =error - avgbit rate;
    end
    avgerror = avgerror + error;
    errorcount = errorcount +1;
  end
end
avgerror = avgerror/errorcount;
starttime = acqtime(firstgood-1) + avgerror + bitsampoft;
for(i)= 1:1:6)
    bitsamptime(i) = round(starttime + (i * avgbit rate));
end
```

After initial acquisition, the bit sample times generated above may be used to collect samples from each of the four correlation outputs in the bit sample collection module 136. In an aspect of the invention, the sixth sample time is checked to see if it exceeds the block size . Sample code, using Matlab®, for checking if the sixth sample time exceeds the block size is shown below:

```
% Bit Sample
for i=(1:1:6)
  bitsamp00(i) = magcorrout00(bitsamptime(i));
  bitsamp01(i) = magcorrout01(bitsamptime(i));
  bitsamp10(i) = magcorrout10(bitsamptime(i));
  bitsamp11(i) = magcorrout11(bitsamptime(i));
end
```

The bit sample collection module 136 may then provide time correlated bit samples for the four correlation outputs to a bit decision module 138.

After initial acquisition, DSP 3 82 may use the peak correlation values and respective timing generated above to make data decisions based on the peak correlation values for each of the four correlation outputs of a respective received bit transition. For example, the bit decision module 138 may receive the time correlated bit samples for the four correlation outputs to determine which bit transition should be used for a bit decision. In one form, data decisions are based on finding the largest magnitude value of the peak correlation values of the four correlation outputs. The data decision process may find the second largest magnitude value of the peak correlation value and subtract the second largest value from the largest value and save it as a "decision distance." In addition, decision distances may be calculated among the peak correlation value and the third and fourth largest magnitude values of the peak correlations. In an aspect of the invention, a bit transition may be disregarded if the largest peak correlation value and the second largest correlation value for the bit transition are equal. In another aspect, a bit transition may be disregarded if the corresponding plurality of correlated bit transition values indicates that more than one bit decision is valid, such as if any two or more of the peak correlation values are equal.

The process may compute a running sum of the decision distances calculated for each acquired bit transition and a distance count of the number of bit decision calculated. As a result, an average bit decision distance for an entire received data stream may be calculated. The bit decision module 138 may then provide bit decision, a bit decision distance, and a bit number for each data decision, and provide these values to a bit correction module 140. Matlab® code implementing the above described functions are shown below:

```
% Bit Decision Determination
for i=(1:1:6)
  tmpdata(1) = bitsamp00(i);
  tmpdata(2) = bitsamp01(i);
  tmpdata(3) = bitsamp 10(i);
  tmpdata(4) = bitsampll(i);
  [maxval,datadec] =max(tmpdata);
    tmpdata(datadec) = 0;
  [secval,dummy] =max(tmpdata);
  if(datadec == 1)
    bitdata(i) = 00;
  end
  if(datadec == 2)
    bitdata(i) = 01;
  end
  if(datadec == 3)
    bitdata(i) = 10;
  end
  if(datadec == 4)
    bitdata(i) = 11;
  end
  bitdist(i) = maxval - secval;
end
```

After initial acquisition of data, DSP 3 82 may be configured to check the selected data decisions for errors. The bit correction module 140 may receive the bit decision and a bit decision distance and analyze the bit decision with regard to a prior adjacent bit decision to determine if a proper bit decision was selected. In addition, the bit correction module 140 may receive the number of bits processed from the bit sample time module 134. Each data decision for a bit transition in the data stream should be self consistent. For example, a data decision for a bit transition of "x0" (where x may be a 0 or a 1) should only be followed by a "00" of "01" bit decision, not a "10" or "11" bit decision. Similarly, a bit transition of "x1" (where x may be a 0 or a 1) should only be followed by a "10" of "11" bit decision, not a "00" or "01" bit decision. This process may use the bit decision distance to correct these errors by correcting the decision with the bit transition having a smallest decision distance from the first bit decision. If a second bit decision is invalid, the decision may be reported as an invalid bit transition and may not be used in further timing calculations. Table 1 below depicts an exemplary received bit transition sequence and a reconstruction of the bit sequence using error correction as described above.

TABLE 1

| Received Bit Transition Sequence: | 01011 | Transmitted Signal |
|---|---|---|
| First Bit Transition Decision: | 01 | Valid decision |
| Second Bit Transition Decision: | 10 | Valid decision |
| Third Bit Transition | 11 | Invalid decision, change to bit decision having second highest correlation peak |

TABLE 1-continued

| Decision: | | value (smallest decision distance) |
|---|---|---|
| Revised Third Bit Transition Decision: | 01 | Valid decision |
| Fourth bit decision: | 11 | Valid decision |

After initial acquisition, DSP 3 82 determines sample times to provide a time of acquisition determination for each block of data. For example, data decisions corresponding to bit transitions of the form "01" or "10" may be used to generate a time of acquisition sample time by subtracting a fixed offset, such as 125 counts, from the bit sample time. The bit correction module 140 may then provide bit decisions to a TOA sample timer 142. In addition, the bit correction module 140 may also provide a bit error count to track the number of bit decisions in error. Sample code implementing the above described functions in Matlab® is shown below:

```
% TOA Sample Times Determination
toahits = 0;
for i(1: 1:6)
if((bitdata(i)== 01) | (bitdataO== 10))
toahits = toahits +1;
toasamptime(toahits) = bitsamptimeO) - 125;
toadata(toahits) =bitdata(i);
end
end
```

In a further aspect of the invention, a time of acquisition value for each block of data may be determined by DSP 3 82. For example, data decisions corresponding to bit transitions of the form "01" or "10" may be used to generate a time of acquisition value for the block. The time of acquisition value may be generated by finding the minimum value of the least square error of a sampled correlation waveform versus an ideal waveform reference of, for example, 50 sample points over 50 possible positions. The TOA sample timer module 142 may receive the bit decision; the bit sample time; the number of bits and the current bit number to provide a TOA; a TOA sample time; a TOA index; and a TOA hits counter to a TOA sample value module 144. The TOA sample value module 144 receives the bit sample time, the number of bits, and the current bit number from the TOA sample timer module 142. The TOA sample value module 144 also may receive a time tag, for example, generated in the FPGA 76 and a TOA reference, such as the timing synchronization pulse from a GPS satellite. Using these inputs, the TOA sample value module 144 may generate a TOA value for each received block of data. Sample code implementing this in Matlab® is shown below.

```
% TOA Determination
for i=(1 :1 :toahits)
starttime = toasamptime(i);
if(toadata(i) == 10)
for m=(1:1:50)
errout =0;
for k=(1:1:50)
tempt = starttime + m + k;
errout = errout + ((magcorroutol(tempt) - toaref(k))^2);
end
erwal(m) = errout;
end
else
```

```
for m=(1:1:50)
errout =0;
for k=(1:1:50)
tempt =starttime + m + k;
errout = errout + ((magcorrout10(tempt) - toaref(k))^2);
end
errval(m) = errout;
end
end
```

Once the TOA value is generated, the value can be compared with TOA values of the same data block for different receivers, for example, at the CAP 48, to determine a time delay of arrival for the signal, which allows locating the transmitter of the signal via for example, hyperbolic trilateration.

To reduce transmission bandwidth needed to transmit information to the CAP 48, (such as the TOA values from respective receivers), the amount of time stamp information required to be transferred may be compressed using the following innovative technique. While in hold mode, DSP 3 82 may search the data decision stream for recognizable codes such as a Barker code used in an EDACS® communication format. For example, in an EDACS® format, three Barker code words 0x85B3, are used and 14 out of the 16 bits on all three code words must be correct to declare synchronization. When synchronization is found in the data decision stream, DSP 3 82 may generate an absolute Barker time tag word corresponding to, for example, a "01" transition of the "3" nibble of the last Barker sync word. The absolute Barker time tag word may contain a 32 bit value representing a timing offset from a one pulse per second timing synchronization pulse received from a GPS satellite. A bit counter, synchronized for example, to the timing synchronization pulse, may also be started after the last bit of the last Barker sync word to provide an offset timing reference from this point.

After the last Barker Sync Word is detected, DSP 3 82 may be configured to collect the data decision stream corresponding to the next 120 bits. For example, in an EDACS® format, the 120 bits of information following the three Barker sync words are three copies of a 40 bit message, with a second copy being the inverse of a first and a third copy. Table 2 below depicts an exemplary EDACS® formatted data signal, having 108 bits of dotting information (a series of 01 10 01 transitions, from which timing and frequency synchronization may be established), three 16 bit Barker sync words (B), and three copies of a 40 bit message (M) where each message M is 40 bits long and includes 28 message bits and 12 parity bits:

TABLE 2

| Dotting | B | B | B | M | M(inverse) | M |
|---|---|---|---|---|---|---|

The process may take the three 40 bit message copies, invert the middle copy, and then perform a majority decision on a bit by bit basis to arrive at a single 40 bit message. For example, if the least significant bit (LSB) of the message is "1" in the first copy, "1" in the second inverted copy, and "0" in the third copy, a majority decision would result in a bit decision of the LSB of "1," with an error detected in the LSB of the third copy. In another aspect of the invention, a portion of the 40 bits in each message, such as the last 12 bits of the 40 bit message, may be used as a BCh code word which may be used for further error correction.

An end of message process may be declared when a counter indicates that all 120 bits of an EDAC message, for example, have been received. If all 120 data bits have been received, the process will terminate and return to the acquisition mode. However, if more than 200 bit times have passed since initial acquisition, for example, for an EDACS formatted signal, and no Barker sync word has been recognized, the process will terminate and return to the acquisition mode.

When a valid data signal has been received, DSP 3 82 collects the 28 bit message, the average bit decision distance, the absolute Barker time tag, the average bit rate and, in an aspect of the invention, compressed TOA tags for all bit transitions in data signal. The inventors of the present invention have innovatively realized that a transmission bandwidth required to send TOA information to a central location, such as the CAP 48, may be minimized by only sending a deviation error value corresponding to the average bit rate spacing from the absolute time tag. In one form, the timestamps may be associated with, for example, EDACS® message bit transitions of the form "01," and "10." To minimize data bandwidth required to send information from each receiver to the CAP 48, and to also minimize calculations at CAP 48, timestamp data is sent only for transitions with "good" calculated timestamp information. For example, a timestamp may be considered "good" if the correlation value for the transition exceeds a correlation threshold and if the bit decision for the correlated transition has been verified (or corrected) as a correct transition based on a prior adjacent bit transition. Accordingly, the amount of timestamps sent to the CAP 48 may vary according to the number of timestamps. For example, the amount of timestamps (TS) sent may vary from TS1 . . . TSn, where n is the total number of decoded bit transitions in the data signal with good calculated timestamps.

The data sent to the CAP 48 may be further reduced by sending the full timestamp, for example, with a 20 nanosecond resolution, using 4 bytes (26 bits required) for the absolute Barker time tag, and the difference between a nominal value for a bit length (for example, a nominal value of 521 in 200 nanosecond counts for one bit length in a 50 Mhz clocked system) and a current bit time tag value for succeeding bits, and for preceding bits, such as 44 bits for dotting, measured from the absolute Barker time tag. For example, a time stamp mask containing one bit for each bit transition timestamp may be generated that begins with a first message bit and continues through the 120th message bit. The mask may then start at the 47th Barker bit and continue to the first Barker bit. Finally, the mask may start at the last dotting bit and continue to either the first dotting bit detected, or a total of 320 bits, whichever comes first. In the timestamp mask, a "0" may be used to represent that non-valid timestamp is available, and a "1" may be used to represent that a valid timestamp is available. A data word may also be provided to indicate the number of "1's" in the timestamp mask. An array structure for storing the mask information may be setup, for example, using Matlab, as shown below:

```
struct SDspEventMsg
{
char SignalQuality;
unsigned int EdacsBits;
unsigned int BarkerTimestamp;
unsigned int TimestampMask[TIMESTAMP_MASK_SIZE];
unsigned short NumTimes;
char Times[MAX_ADDIR_TIMESTAMPS];
};
```

With this novel approach, difference values for time tags measured from the absolute Barker time tag may be advantageously transmitted using one byte for each difference value. In a further aspect, a timestamp bitmap (TSBM) "word," including a logical true "1" or false "0" representing whether a message bit number in the received EDACS® message has a valid time stamp value associated with a received bit transition, may also be sent to the CAP 48. For example, the bitmapped word may include 40 bytes, or 320 bits of information (44 bits, or 5.5 bytes, of information corresponding to dotting, followed by 276 bits or 34.5 bytes corresponding to the message in the data signal).

Accordingly, at the CAP 48, a logical "AND" of the TSBM from at least two sites may identify which of the message bits from each site can participate in a TDOA calculation. For example, if bit 4 is valid for two receivers 12, 14 as indicated by an AND of the TBSM received from each of the receivers 12, 14, these bits may be used in the TDOA calculation.

A count of the number of 1's in the resulting AND of TBSM's gives the total number of subtractions, N, required for a TDOA calculation between the receivers 12, 14. This AND calculation may be repeated for as many sites as required. Accordingly, a final TDOA calculation between two receivers, n, m, may be computed using the formula (1):

$$\text{TDOA}[n,m] = (1/N)\Sigma[\text{TS}(\text{receiver } n, \text{bit } i) - \text{TS}(\text{receiver } m, \text{bit } i)]; \quad (1)$$

where i corresponds to the "1" positions in the AND result.

Once processed in this manner, the TS values (offset from the absolute Barker time tag) may need to be recalculated to give the absolute time tag measured, for example, from the resetting pulse received from a GPS satellite.

Accordingly, the CAP 48 may receive TOA values and a TBSM word from at least three of the receivers 12, 14, 16, 18 to compute time differences of arrival of a common transmitted signal received by the receivers 12, 14, 16, 18. By using a known hyperbolic trilateration approach based on the TDOA's of the signal, the position of the transmitter 20, may be determined in a bandwidth efficient and accurate manner.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer or processor, the computer or processor becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer or processor, the computer or processor becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. For example, this invention can be applied to a multitude of wireless systems, with radio or signaling protocols being remotely updated or applied to fixed receiver sites. Furthermore the bit error correction aspect of the invention may be applied to any digital communication system, such as a GMSK, an MSK, a PSK, a QPSK, a M-ary PSK, or a FSK formatted digital system. Accordingly, it is intended that the invention be limited only by the spirit and scope of the appended claims.

I claim:

1. A method of detecting and correcting bit errors in a digitally encoded data stream comprising:
    correlating a received bit transition in the data stream with a plurality of possible bit transitions to generate a corresponding plurality of correlated bit transition values;
    generating a bit transition decision for the received bit transition corresponding to a greatest correlated bit transition value;
    comparing consecutive bit transition decisions to identify bit transition decision errors;
    determining if a respective bit transition decision is consistent with a prior adjacent bit transition decision in the data stream; and
    substituting, for each bit transition decision for which a bit transition decision error is determined, the next greatest correlated bit transition decision.

2. The method of claim 1, further comprising disregarding a bit transition if the greatest correlation value and the next greatest correlation value for the bit transition are equal.

3. The method of claim 1, further comprising disregarding a bit transition if two of more correlated bit transition values are equal.

4. The method of claim 1, further comprising disregarding a bit transition if the greatest correlation value and the next greatest correlation value for the bit transition are inconsistent with the corresponding prior adjacent bit transition.

5. The method of claim 1, wherein correlating a received bit transition further comprises:
    performing a Fourier transform on each bit transition to generate a frequency domain representation of the bit transition;
    convolving the frequency domain representation of the bit transition with each of a plurality of frequency domain representations of possible bit transitions to generate respective convolution responses; and
    performing an inverse Fourier transform on the respective convolution responses to generate respective bit transition correlation values corresponding to each of the possible bit transitions.

6. The method of claim 1, wherein an encoding format of the data stream is selected from the group comprising a GMSK, an MSK, a PSK, a QPSK, a M-ary PSK, and an FSK format.

7. A method of detecting and correcting bit errors in a digital communication system comprising:
    correlating a received bit transition with a plurality of possible bit transitions to create a plurality of correlation values corresponding to each of the possible bit transitions;
    generating a bit transition decision for the received bit transition corresponding to a greatest correlated bit transition value; and
    further comprising comparing consecutive bit transition decisions to identify bit transition decision errors.

8. The method of claim 7, further comprising:
    determining if a respective bit transition decision is consistent with a prior adjacent bit transition decision in the data stream; and
    substituting, for each bit transition decision for which a bit transition decision error is determined, the next greatest correlated bit transition decision.

9. A method of detecting and correcting bit errors in a digital communication system comprising:
    acquiring a plurality of bit transition samples from a digital data stream;
    correlating each of the bit transition samples with a plurality of possible bit transitions to create a corresponding plurality of correlated bit transition values;
    generating, for each bit transition sample, a bit transition decision corresponding to a greatest correlated bit transition value from the plurality of correlated bit transition values;
    determining, for each bit transition sample, a bit transition decision corresponding to a second largest correlated bit transition value from the plurality of correlated bit transition values;
    subtracting, for each bit transition sample, the largest correlated bit transition value from the second largest correlated bit transition value to determine a bit transition decision distance value;
    assigning, for each bit transition sample, a first bit transition decision corresponding to the bit transition having the largest correlated bit transition value;
    assigning, for each bit transition sample, a second bit transition decision corresponding to the bit transition having the second largest correlated bit transition value;
    determining, for each bit transition sample, if the first bit transition decision is consistent with a prior adjacent bit transition decision in the digital data stream; and
    if the first bit transition decision is inconsistent with the prior adjacent bit transition decision, replacing the first bit transition decision with the second bit transition decision.
    comparing consecutive bit transition decisions to identify bit transition decision errors;
    determining if a respective bit transition decision is consistent with a prior adjacent bit transition decision in the data stream; and
    substituting, for each first bit transition decision for which a bit transition decision error is determined, the second bit transition decision.

10. The method of claim 9, wherein correlating each of the bit transitions samples comprises convolving the bit transition sample with each of the plurality of possible bit transitions.

11. The method of claim 9, wherein the plurality of possible bit transitions comprises waveforms corresponding to a 00 bit transition, a 01 bit transition, a 10 bit transition, and a 11 bit transition.

12. The method of claim 9, wherein determining if the first bit transition decision is consistent with a prior adjacent bit transition decision further comprises:
    determining if a prior adjacent bit transition decision of the form "x0" is followed by a first bit transition of the form "0x;" and
    determining if a prior adjacent bit transition decision of the form "x1" is followed by a first bit transition of the form "1x."

* * * * *